United States Patent
Vithayathil et al.

(10) Patent No.: US 6,867,570 B2
(45) Date of Patent: Mar. 15, 2005

(54) CIRCUIT ARRANGEMENT FOR THE STATIC GENERATION OF A VARIABLE ELECTRIC OUTPUT

(75) Inventors: John J. Vithayathil, 6685 W. Burnside Rd., Unit No. 355, Portland, OR (US) 97210; Kadry Sadek, Erlangen (DE)

(73) Assignee: John J. Vithayathil, Portland, OR (US)

( * ) Notice: Subject to any disclaimer, the term of this patent is extended or adjusted under 35 U.S.C. 154(b) by 9 days.

(21) Appl. No.: 10/362,379
(22) PCT Filed: Aug. 17, 2001
(86) PCT No.: PCT/DE01/03161
§ 371 (c)(1),
(2), (4) Date: Aug. 21, 2003
(87) PCT Pub. No.: WO02/15362
PCT Pub. Date: Feb. 21, 2002

(65) Prior Publication Data
US 2004/0066664 A1 Apr. 8, 2004

(30) Foreign Application Priority Data
Aug. 18, 2000 (DE) .......................................... 100 42 870
Feb. 6, 2001 (DE) .......................................... 101 07 397

(51) Int. Cl.$^7$ .............................................. G05F 1/70
(52) U.S. Cl. ...................... 323/205; 323/210; 363/128
(58) Field of Search ................................. 323/205, 206, 323/207, 208, 209, 210; 363/67, 68, 69, 128

(56) References Cited

U.S. PATENT DOCUMENTS

| | | | | |
|---|---|---|---|---|
| 3,195,038 A | * | 7/1965 | Fry .............................. | 363/128 |
| 3,955,134 A | * | 5/1976 | Woodford ..................... | 323/210 |
| 4,001,670 A | * | 1/1977 | Gyugyi et al. ............... | 323/207 |
| 4,104,576 A | * | 8/1978 | Frank ........................... | 323/210 |
| 4,306,283 A | * | 12/1981 | Kiwaki et al. ................ | 363/68 |
| 4,375,076 A | * | 2/1983 | Magnusson et al. .......... | 363/68 |
| 6,246,218 B1 | * | 6/2001 | Tambe ......................... | 323/205 |

* cited by examiner

Primary Examiner—Jessica Han
(74) Attorney, Agent, or Firm—Blakely, Sokoloff, Taylor & Zafman; Stephen M. De Klerk

(57) ABSTRACT

The novel circuit arrangement is used for the static generation of a variable electric output, as is common in static reactive-power compensation systems. According to the invention, a voltage is applied to a consumer, i.e. to a capacitor and/or an inductor, and a transformer (T) has at least two power-control windings (W1, W2) in a secondary circuit, said windings being connected electrically in series via bridge circuits (B1, B2). In their branches, the bridge circuits contain static switches (BSS1 . . . 4) in an inverse-parallel connection, said switches can be selectively connected or disconnected.

7 Claims, 5 Drawing Sheets

CIRCUIT ARRANGEMENT FOR THE STATIC GENERATION OF A VARIABLE ELECTRIC OUTPUT

This Application is a National Phase of International Application No. PCT/DE01/03161 (WO 02/15362 A1), filed on Aug. 17, 2001, which claims priority from German Patent Application No. 101 073 97.6, filed on Feb. 6, 2001 and German Patent Application No. 100 428 70.3, filed on Aug. 18, 2000.

BACKGROUND OF THE INVENTION

The invention lies in general in the area of static generation of electrical power, in particular in the area of the static reactive-power compensation systems. At present the static reactive-power systems (STATIC VAR SYSTEMS) are divided in two broad categories:

(1) Static reactive-power systems, which are based on the generation of reactive-power by inductors or capacitors;

(2) Static compensation systems (Statcoms), which rely on that matter, that by means of a sinusoidal voltage source, which voltage is different to the energy system and which is generated by means of power electronic circuits, a reactive-power is taken out of the energy system or reactive-power is supplied to this energy system by controlling the magnitude of the voltage which is generated by this separate voltage source. At present the second type of static reactive-power compensators is essential more expensive than the first type (DE-Z "ABB Technik", 5/99, page 4–17).

The present invention relates more to the first category. There are three types in this category at the moment:

(1) inductors which are switched by means of thyristors (TSR), (2) capacitors which are switched by means of thyristors (TSC) and (3) inductors which are controlled by means of thyristors (TCR).

With the TSR and TSC types anti-parallel connected thyristor rectifiers are used as static switches in order to switch inductors or capacitors on or off and because of that to control the reactive-power flow. Such an on-off-control enables changes of the reactive-power flow in discrete steps. An economic design of such systems includes normally the use of a step transformer in order to create the connection to the rectifier and the inductor or to the capacitor. In order to achieve a fine control of the reactive-power supply by such a on-off controlling one need a larger number of static reactive-power compensators which are connected in parallel. Such an apparatus would request a large number of thyristor rectifiers which are designed for the full voltage. This would lead to an increase of the costs.

In the case of the TCR type the anti-parallel connected thyristor rectifiers are not only used to switch on/off the static reactive-power compensators (SVC) but also to change the reactive-power flow by adjusting the firing angle of the rectifiers. The change of the firing angle changes the time span during which the inductor leads a current and thus changes the effective resistance of the inductor. Differing from the TSR and TSC types, the TCR type enables a continuous control of the reactive-power. However, the interruptions of the current which flows through the inductor leads to harmonic waves, which requires the use of very expensive harmonic wave filters.

For creating a variable electrical voltage or an electrical current in the lower voltage area it is well-known to provide a transformer on its secondary side with several partial windings which are electrically arranged in series whereby the arrangement of a serial circuit as each done by a bridge circuit which has two anti-parallel connected static switches in each bridge branch. These bridge circuits are—should the occasion arise together with a partial winding, to which no bridge circuit is assigned—electrically arranged in parallel to a load (U.S. Pat. No. 3,195,038 A, FIGS. 7 and 8).

By the present invention the main disadvantages of the known steps of reactive-power compensation which use on/off switching and resistance controlling, should be overcome. The invention has the advantage that no harmonic wave filters are needed although the reactive-power flow is changeable in steps and achieves this in a manner that has as a result no significant increase of costs for thyristor rectifiers.

Starting from the circuit arrangement with the features of the preamble of claim 1, different circuit arrangements according to the claims 1 to 3 and 5 are provided in order to solve the object which circuit arrangements rely on the common idea that the load is formed by the capacitor as well as by the inductor and that the total power which is supplied to this load is variably adjustable by the secondary partial windings of a transformer which are assigned to the capacitor as well as to the inductor and by the anti-parallel circuits of the static switches which are assigned to these partial windings.

Short description of the circuit arrangements shown in the following figures for carrying out the invention:

DETAILED DESCRIPTION OF THE CIRCUIT ARRANGEMENTS

Within the scope of the present invention, a voltage is supplied to a capacitor and/or to an inductor by a transformer T which has several secondary windings which are intended to connect the secondary windings in different manners by the static switches BBS so that the provided voltage can be changed in small steps. According to the figures, the transformer which is supplied by an alternating voltage source U, is provided on the secondary side by a fixed winding Wf and a certain number of control windings Wi (1 . . . n). Each of the control windings is connected to four bidirectional static switches BSS 1 . . . 4, for example to anti-parallel connected thyristor rectifiers which are arranged in a bridge circuit B1 and B2, respectively.

Figure 1:
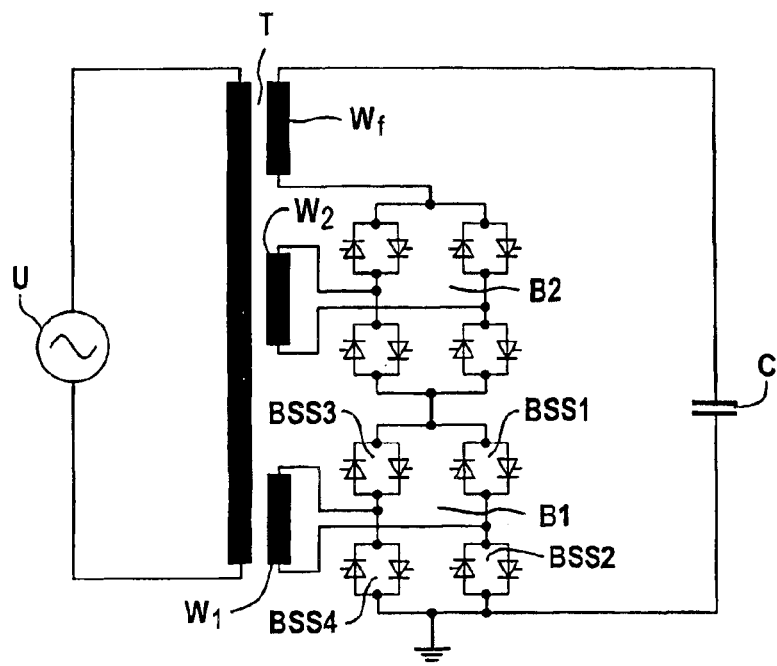
FIG. 1 shows the principal procedure in order to achieve an arrangement which is made according to the present invention where this arrangement has two control windings and one fixed winding on the secondary side of the transformer in order to achieve a voltage controlled capacitor which is switched by thyristors.
Figure 2:
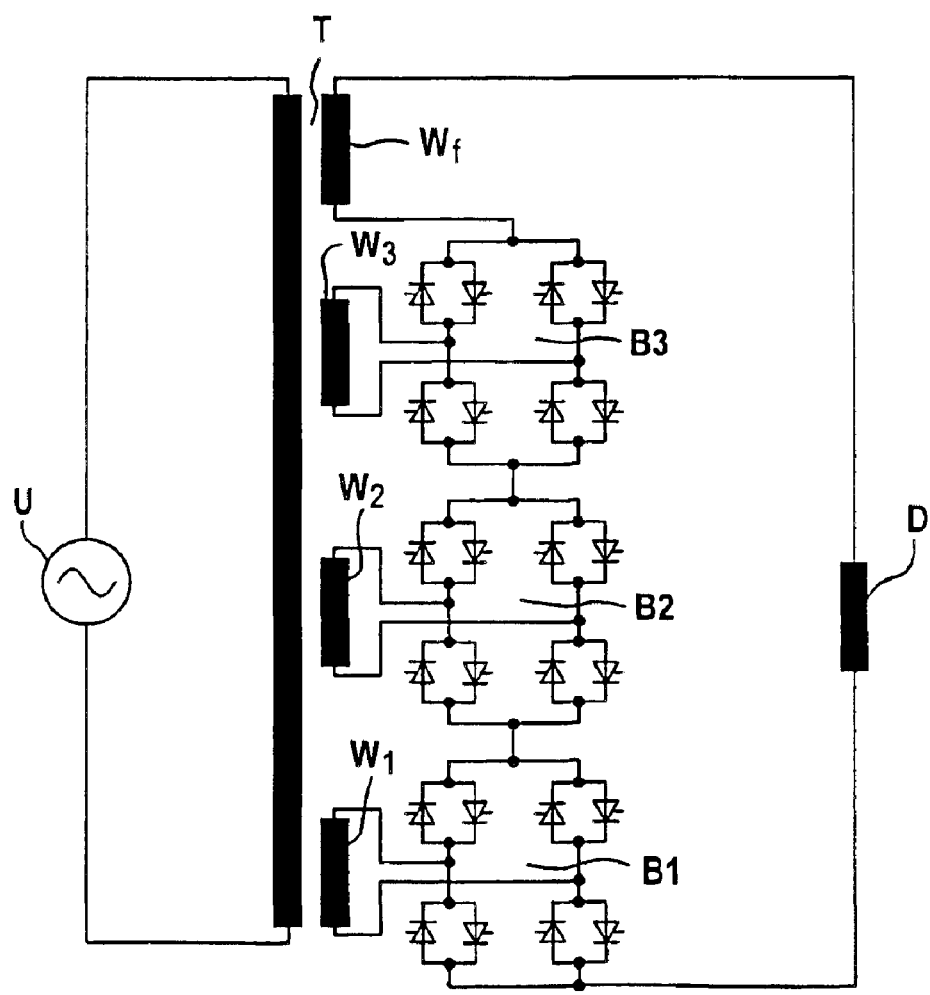
FIG. 2 shows the same procedure for an arrangement by which three control windings and one fixed winding are provided on the secondary side of a transformer in order to achieve a voltage controlled inductor which is switched by thyristors.

FIG. 1 shows such an arrangement with two control windings W1 and W2 for a voltage controlled capacitor C which is switched by thyristors. A similar arrangement for a voltage controlled inductor which is switched by thyristors, which has three control windings W1, W2 and W3 is shown in FIG. 2.

In the case that each two switches BBS, which are opposite in the bridge circuit, at instant blockade of the other two switches, are switched on, it is possible to connect the according control winding on three different kinds to the lasting windings:

(1) In series with the fixed winding Wf in that manner that the voltages of the fixed winding and of the corresponding control winding are in phase.

(2) In series with the fixed winding, whereby the voltages of the fixed winding and the corresponding control winding are in opposite phase to each other; or (3) The control winding is left out.

The number of the control windings and their voltage design determine the number of the steps and the size of the steps. To reach uniform step sizes with an as possible small number of control windings, the voltage of the control windings Wi is so chosen that it has the value of $V0 \times 33^{(i-1)}$, whereby V0 is the smallest step size, n is the number of control windings and i is a normal number with values from 1 to n.

In FIG. 1, where two control windings W1 and W2 are provided, it is possible to achieve nine combinations of the supplied voltage: first Vf, then Vf +/−V0, further Vf +/−2 V0, further Vf +/−3 V0 and Vf +/−4 V0, whereby Vf is the voltage of the fixed winding. When Vf=4 V0 then the voltage provided to the capacitor can be changed between 0 and 8 V0 in eight equal steps. Since a voltage of 0 can be reached, when all rectifiers BBS are blockaded, one gets—as far as one makes Vf=5 V0—nine voltage steps between 0 and 9 V0.

In a similar way, as shown in FIG. 2, it is possible to change the provided voltage to the inductor D in 27 steps by three control windings W1, W2 and W3. Basically one can achieve $3^n$ steps, when n control windings are provided.

The voltage changes are made in discrete steps, i.e. discontinuous. From the practical point of view, however, the step sizes can be made however as small as needed—in principal so small to be not distinguishable in the scope of the measurement accuracy—, by increasing the number of control windings.

The reactive load control is normally used for the purpose of control of a system voltage which is normally not controlled to a special value, but must be kept only in a certain bandwidth. Therefore, it is appropriate when the step size of the voltage which is provided to the inductor or to the capacitor, is so small that the resultant change of the reactive-power supply in the controlled voltage system causes voltage changes which are small in comparison to the specified voltage band.

It is possible to make the control of the reactive-power of such an arrangement actually continuous if a particular secondary winding is provided which supplies an additional arranged conductor (TCR) which is controlled by thyristors. The bulk size of such a supplemental measure must riot be particularly large but only as large as the largest step size for changing the reactive-power requests for step sizes of the voltage which is provided to the reactive-power element. Thereafter, the rough control of the reactive-power supply is affected by stepwise changes of the voltage which is provided to the reactance, and in between this steps, an additional fine control is achieved by controlling the TCR element, i.e. of the additional inductor which is controlled by means of thyristors. The bulk size of the TCR-building group can be made small enough in order to make harmonic waves which result from the operation of the TCR element so small that no harmonic wave filters are requested.

Instead of the fixed winding also a control winding can be provided so that all windings of the transformers are defined as control windings. However, such an embodiment would increase the necessary total number of the static control switches.

It is neither necessary nor always desirable that all step sizes of the voltage have the same size. Reactive-power is proportional to the square of the voltage applied. When the voltage which is provided to a reactance is increased from V to $V+V_0$, this leads to a change of the reactive-power by the value $V_0^2 + 2\ V \times V_0$. The higher the output value of the voltage, the larger is the step size in case of the change of the reactive-power. Therefore, a larger step size is acceptable in regard to the applied voltage for the first steps. A way to provide a larger step size only for the first steps and to make the other steps equal in size, consists in choosing the voltage of the fixed windings relatively large. When, for example, like in the case of FIG. 1 with two control windings, $Vf = 8 \times V_0$, then the smallest value of the provided voltage is equal to $4 \times V_0$ and every following step comprises steps of the magnitude $V_0$.

Figure 4:
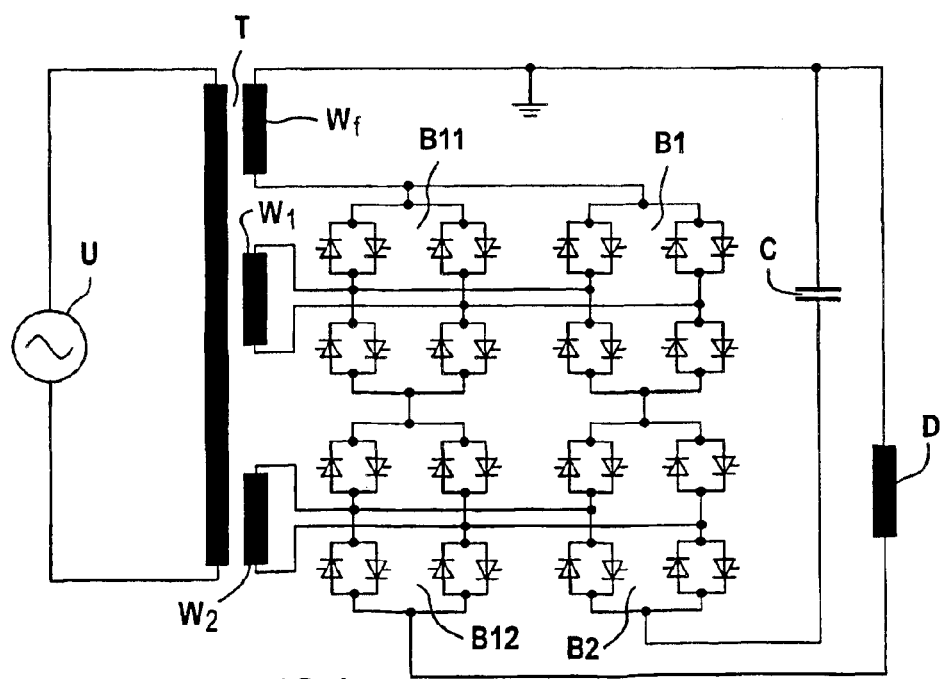
FIG. 4 shows a second embodiment of the invention, namely an arrangement for a VCSVC with common secondary transformer windings for capacitor and inductor but with separated rectifier bridges for the control of the voltages which are supplied to the capacitor and the inductor.
Figure 3:
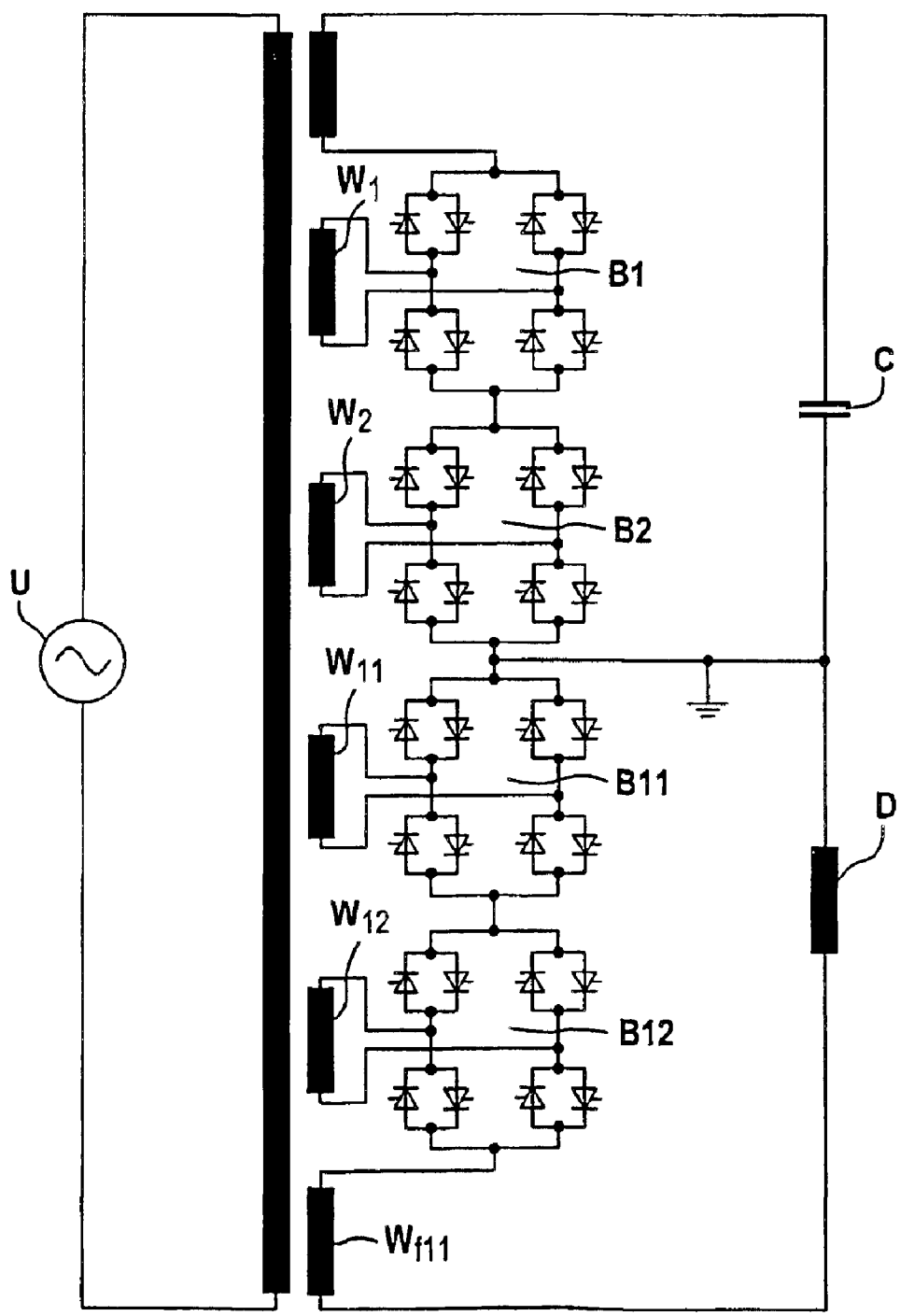
FIG. 3 shows a first embodiment of the invention, namely an arrangement for a voltage controlled static reactive load compensator (VCSVC) with separated secondary transformer windings for the control of the voltages which are supplied to a capacitor and an inductor.

According to the invention, there are different possibilities to combine the arrangements for capacitive and inductive reactive-power supply such that one gets a voltage controlled, static reactive-power compensator (VCSVC) with a specific operation range from inductive to capacitive MVAR. One method would be to have separate secondary windings $W_{f1}$, $W_1$ and $W_2$ as well as $W_{f11}$, $W_{11}$, and $W_{12}$ of the transformer each having its own rectifier groups B1 and B2, and B11 and B12 respectively, as is shown in FIG. 3. In this case, it is required to have the same arrangement of secondary windings for the TSC- and TSR-parts as far as it regards the number of windings or their voltage dimensioning. In another arrangement, when the TSC- and TSR-parts do not have to be activated at the same time, both parts can use the same secondary windings $W_f$, $W_1$ and $W_2$ of the transformer but they should have separate rectifier groups B1, B2, respective B11 and B12, as is shown in FIG. 4. Another possibility would be to have common secondary windings of the transformer T and common rectifier groups B1, B2 for the TSC- and TSR-parts, but to provide additional static switches BSS11, BSS12 in order to select between the use of the capacitor C or the inductor D, as is shown in FIG. 5.

Figure 5:
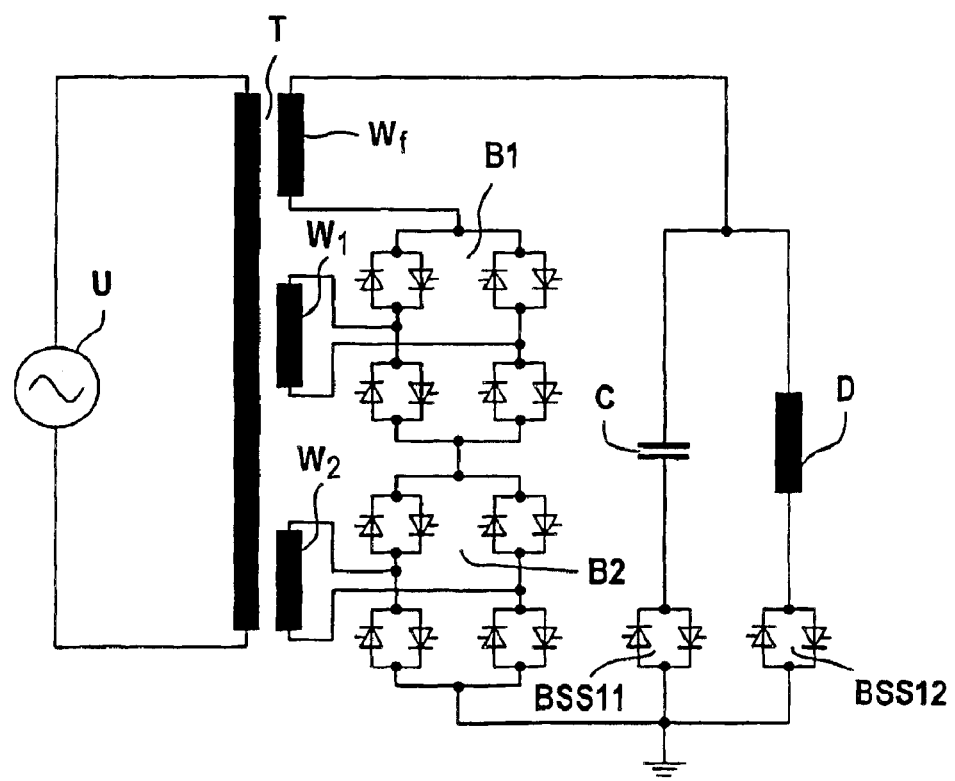
FIG. 5 shows a third embodiment of the invention, namely an arrangement of a VCSVC with a common transformer and common rectifier bridges for the capacitor and the inductor and with additional static switches for the selection of the type of the reactive load flow.
Figure 6:
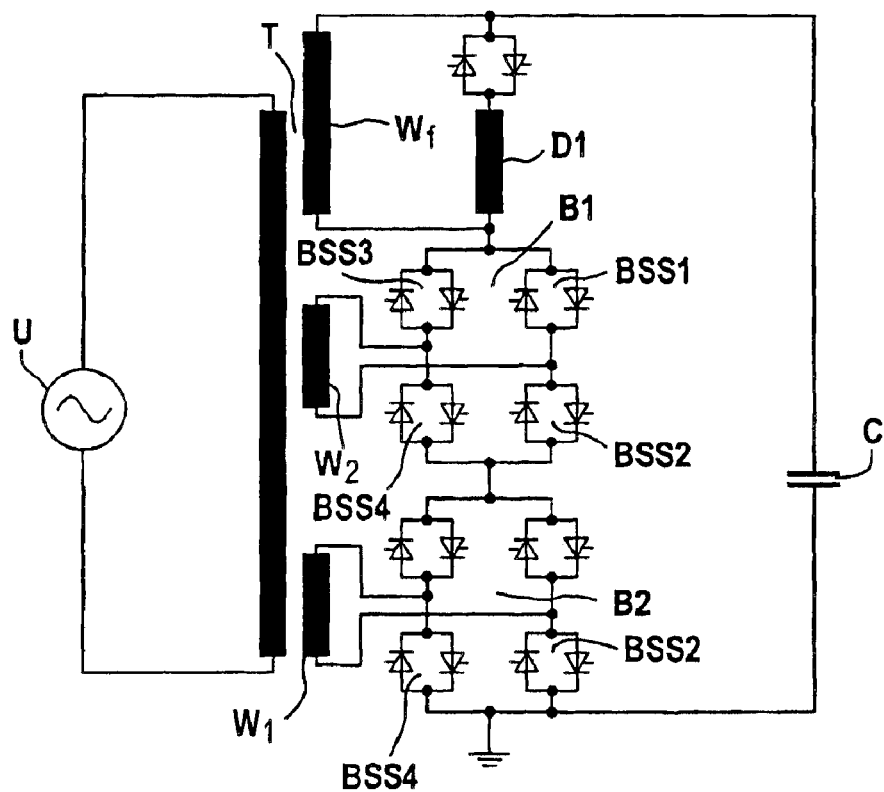
FIG. 6 shows a fourth embodiment of the invention and especially a simplified application of an arrangement of a VCSVC, which is used for a working field of an inductive to capacitive reactive load.

In order to simplify the circuit arrangements for an operation range from inductive to capacitive reactive load, which are shown in the FIGS. 3 to 5, one can also arrange in parallel to the further partial winding, which is not connected to a bridge branch, a serial circuit of an inductor or a capacitor and two anti-parallel connected rectifiers, as is shown in FIG. 6. In such a design of the circuit arrangement, the secondary side of the transformer is loaded by an inductive or a capacitive base load where this base load can be reduced by additionally connecting a capacitive or inductive additional load which is controllable in its magnitude. With the base load is disconnected, a load is only given by the controllable additional load.

Similar to FIG. 1, FIG. 6 shows a circuit arrangement with three partial windings $W_f$, $W_1$ and $W_2$ on the secondary side of the transformer T where the partial windings $W_1$ and $W_2$ are each connected to a bridge circuit B1 and B2 respectively, and where anti-parallel connected static switches BSS1 . . . 4 are arranged in each branch of the bridge. A serial circuit of an inductor D1 and two anti-parallel connected rectifiers V1, V2 is arranged in parallel to the further partial winding $W_f$, where the rectifiers can define an additional static switch to stop, should the occasion arise, the circuit flow through the inductor.—In case the secondary side of the transformer T is loaded inductively, then a capacitor can be introduced inspite of an inductor D1.

For some of the described arrangements, the voltage strength of the static switches is possibly not sufficient; in order to still provide the requested voltage strength an economic application would comprise inserting additional rectifiers in series with the capacitor C or the inductor D.—In the examples according to the FIGS. 1 to 5 it is possible to use the secondary fixed winding $W_f$ in order to supply other loads.

This and similar modifications in order to enlarge the inner structure or to enlarge the field of the basic idea to apply a voltage to a reactance in order to control the reactive-power supply, are included in the basic ideas of this invention. Every modification which is based on this basic idea, like it is described in the following patent claims, should be covered by these patent claims, and no limitation of the invention described by the present application should be incurred from the present description of the invention.

What is claimed is:

1. A circuit arrangement for static generation of a variable electrical power for a load,
   in which the load is connected, by using anti-parallel connected static switches, to the secondary winding of a transformer whose primary side is connected to an alternating voltage source,
   in which the secondary winding of the transformer (T) provides at least two control windings serving as partial windings ($W_1$, $W_2$),
   in which each partial winding is connected to a bridge circuit (B1, B2) which comprises two anti-parallel connected static switches (BSS1 . . . 4) in each bridge branch,
   and in which the bridge circuits (B1, B2) are arranged in series with respect to each other and are arranged in parallel with respect to the load (C, D), wherein
   the load comprises a parallel circuit of two reactive-power loads in form of a inductor (D) and a capacitor (C), and wherein
   the at least two windings ($W_1$, $W_2$; $W_{11}$, $W_{12}$) each of the secondary side of the transformer with the associated bridge circuits (B1, B2; B11, B12) are assigned to the inductor as well as to the capacitor, respectively.

2. The circuit arrangement according to claim 1, wherein the secondary winding of the transformer (T) comprises a further partial winding ($W_f$), which is arranged electrically in series to the bridge circuits (B1, B2).

3. A circuit arrangement for static generation of a variable electrical power for a load,
   in which the load is connected, by using anti-parallel connected static switches, to the secondary winding of a transformer whose primary side is connected to an alternating voltage source,
   in which the secondary winding of the transformer (T) provides at least two control windings serving as partial windings ($W_1$, $W_2$),
   in which each partial winding is connected to a bridge circuit (B1, B2) which comprises two anti-parallel connected static switches (BSS1 . . . 4) in each bridge branch,
   and in which the bridge circuits (B1, B2) are arranged in series with respect to each other and are arranged in parallel with respect to the load (C, D), wherein
   the load comprises a parallel circuit of two reactive-power loads in form of a inductor (D) and a capacitor (C), and wherein
   the at least two control windings ($W_1$, $W_2$) of the secondary side of the transformer (T) are assigned to the inductor and to the capacitor but to different bridge circuits (B1, B2; B11, B12).

4. The circuit arrangement according to claim 3, wherein the secondary winding of the transformer (T) comprises a further partial winding ($W_f$), which is arranged electrically in series to the bridge circuits (B1, B2).

5. A circuit arrangement for static generation of a variable electrical power for a load,
   in which the load is connected, by using anti-parallel connected static switches, to the secondary winding of a transformer whose primary side is connected to an alternating voltage source,
   in which the secondary winding of the transformer (T) provides at least two control windings serving as partial windings ($W_1$, $W_2$),
   in which each partial winding is connected to a bridge circuit (B1, B2) which comprises two anti-parallel connected static switches (BSS1 . . . 4) in each bridge branch,
   and in which the bridge circuits (B1, B2) are arranged in series with respect to each other and are arranged in parallel with respect to the load (C, D), wherein
   the load comprises a parallel circuit of two reactive-power loads in the form of an inductor (D) and a capacitor (C), wherein
   the at least two control windings ($W_1$, $W_2$) of the secondary side of the transformer (T) as well as the bridge circuits (B1, B2) are assigned to the inductor and to the capacitor, and wherein
   at least one static switch (BSS11, BSS12) is arranged in series to the inductor (D) as well as to the capacitor (C), respectively.

6. The circuit arrangement according to claim 5, wherein the secondary winding of the transformer (T) comprises a further partial winding ($W_f$), which is arranged electrically in series to the bridge circuits (B1, B2).

7. A circuit arrangement for static generation of a variable electrical power for a load,
   in which the load is connected, by using anti-parallel connected static switches, to the secondary winding of a transformer whose primary side is connected to an alternating voltage source,
   in which the secondary winding of the transformer (T) provides at least two control windings serving as partial windings ($W_1$, $W_2$), in which each partial winding is connected to a bridge circuit (B1, B2) which comprises two anti-parallel connected static switches (BSS1 ... 4) in each bridge branch, and in which the bridge circuits (B1, B2) are arranged in series with respect to each other and are arranged in parallel with respect to the load (C, D), wherein the load comprises a capacitor (C) or a inductor, wherein the secondary winding of the transformer (T) has another partial winding ($W_f$) which is electrically arranged in series to the bridge circuit (B1, B2), and wherein a serial circuit of an inductor (D1) or a capacitor and two anti-parallel connected rectifiers (V1, V2), is arranged in parallel to the another partial winding ($W_f$).

* * * * *